(12) United States Patent
Wang et al.

(10) Patent No.: US 10,645,672 B2
(45) Date of Patent: May 5, 2020

(54) METHOD AND DEVICE FOR HANDLING PAGING EXTENSION

(71) Applicant: Telefonaktiebolaget LM Ericsson (publ), Stockholm (SE)

(72) Inventors: Juntuan Wang, Nanjing (CN); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/696,881

(22) Filed: Nov. 26, 2019

(65) Prior Publication Data

US 2020/0100211 A1 Mar. 26, 2020

Related U.S. Application Data

(63) Continuation of application No. 15/307,758, filed as application No. PCT/CN2016/101128 on Sep. 30, 2016, now Pat. No. 10,517,066.

(30) Foreign Application Priority Data

Apr. 27, 2016 (WO) ................ PCT/CN2017/080317

(51) Int. Cl.
*H04W 68/02* (2009.01)
*H04W 68/00* (2009.01)
(Continued)

(52) U.S. Cl.
CPC ........... *H04W 68/02* (2013.01); *H04W 68/00* (2013.01); *H04W 72/085* (2013.01);
(Continued)

(58) Field of Classification Search
CPC ..... H04W 68/02; H04W 68/00; H04W 76/28; H04W 72/085; H04W 72/14; H04W 72/0446
See application file for complete search history.

(56) References Cited

U.S. PATENT DOCUMENTS

| | | |
|---|---|---|
| 2003/0031140 A1 | 2/2003 | Oprescu-Surcobe et al. |
| 2012/0076085 A1 | 3/2012 | Chou |

(Continued)

FOREIGN PATENT DOCUMENTS

| | | |
|---|---|---|
| CN | 101690348 B | 1/2013 |
| CN | 102057734 B | 10/2014 |

(Continued)

OTHER PUBLICATIONS

"Enhancements to EC-PCH," Feb. 15-19, 2016, 3 pages, 3GPP TSG GERAN#69, GP-160188, Nokia Networks.
(Continued)

*Primary Examiner* — Mazda Sabouri
(74) *Attorney, Agent, or Firm* — NDWE LLP

(57) ABSTRACT

Handling of a paging extension in a wireless communication network. A terminal device in the wireless communication network receives, from a base station in the wireless communication network, a message including an indication of a paging extension for the terminal device. The terminal device is associated with a first coverage class. Based on the message, the terminal device determines a second coverage class of a downlink transmission from the base station to a further terminal device. Then, the terminal device determines a target paging group for the paging extension based on the first coverage class and the second coverage class.

12 Claims, 5 Drawing Sheets

300

- DETERMINE WHETHER A PAGING EXTENSION IS REQUIRED FOR A TERMINAL DEVICE, THE TERMINAL DEVICE BEING ASSOCIATED WITH A FIRST COVERAGE CLASS — 310
- IN RESPONSE TO DETERMINING THAT THE PAGING EXTENSION IS REQUIRED FOR THE TERMINAL DEVICE, TRANSMIT A MESSAGE IN A DOWNLINK TRANSMISSION TO A FURTHER TERMINAL DEVICE WITH A SECOND COVERAGE CLASS, THE MESSAGE INCLUDING AN INDICATION OF THE PAGING EXTENSION FOR THE TERMINAL DEVICE — 320
- DETERMINE A TARGET PAGING GROUP FOR THE PAGING EXTENSION BASED ON THE FIRST COVERAGE CLASS AND THE SECOND COVERAGE CLASS — 330

(51) Int. Cl.
*H04W 72/08* (2009.01)
*H04W 72/14* (2009.01)
*H04W 76/28* (2018.01)
*H04W 72/04* (2009.01)

(52) U.S. Cl.
CPC ............ *H04W 72/14* (2013.01); *H04W 76/28* (2018.02); *H04W 72/0446* (2013.01)

(56) References Cited

U.S. PATENT DOCUMENTS

| | | |
|---|---|---|
| 2014/0329550 A1 | 11/2014 | Diachina et al. |
| 2015/0373683 A1 | 12/2015 | Schliwa-Bertling et al. |
| 2016/0105926 A1 | 4/2016 | Diachina et al. |
| 2016/0157251 A1 | 6/2016 | Schliwa-Bertling et al. |
| 2016/0219553 A1 | 7/2016 | Sundberg et al. |
| 2016/0309449 A1 | 10/2016 | Diachina et al. |
| 2016/0338006 A1 | 11/2016 | Lee et al. |

FOREIGN PATENT DOCUMENTS

| | | |
|---|---|---|
| CN | 104798384 A | 7/2015 |
| CN | 105517011 A | 4/2016 |
| CN | 105359555 B | 4/2019 |
| EP | 3284295 A1 | 2/2018 |
| RU | 2111628 C1 | 5/1998 |
| RU | 2411697 C2 | 2/2011 |
| RU | 2416888 C2 | 4/2011 |
| WO | 2015/169256 A1 | 11/2015 |
| WO | 2015/173197 A1 | 11/2015 |
| WO | 2016/166707 A1 | 10/2016 |

OTHER PUBLICATIONS

"Introduction of EC-EGPRS", Feb. 15-19, 2016, 67 pages, 3GPP TSG-GERAN Meeting #69, GP-160167, Change Request for TS 44.018 V13.0.0, St George's Bay, Malta.

"On EC-PCH Design and Enhancements," Nov. 16-20, 2015, 10 pages, 3GPP TSG GERAN #68, GP-151133, Nokia Networks.

3GPP TS 45.002, "3rd Generation Partnership Project; Technical Specification Group GSM/EDGE Radio Access Network; Multiplexing and multiple access on the radio path (Release 13)," Feb. 2016, 130 pages, V13.1.0, 3GPP Organizational Partners.

Communication pursuant to Article 94(3) EPC for Application No. 16823149.6, dated Feb. 1, 2019, 5 pages.

Extended European Search Report for Application No. 16823149.6, dated Mar. 29, 2018, 6 pages.

First Office Action for corresponding JP Application No. 201680002251.0, dated Jul. 24, 2019, 15 pages.

Intention to Grant, EP App. No. 16823149.6, dated Aug. 12, 2019, 78 pages.

International Preliminary Report on Patentability for Application No. PCT/CN2016/101128, dated Nov. 8, 2018, 5 pages.

International Search Report and Written Opinion for International Application No. PCT/CN2016/101128, dated Jan. 25, 2017, 8 pages.

Office Action, RU App. No. 2018141253/08, dated Jul. 31, 2019, 9 pages of Original Document Only.

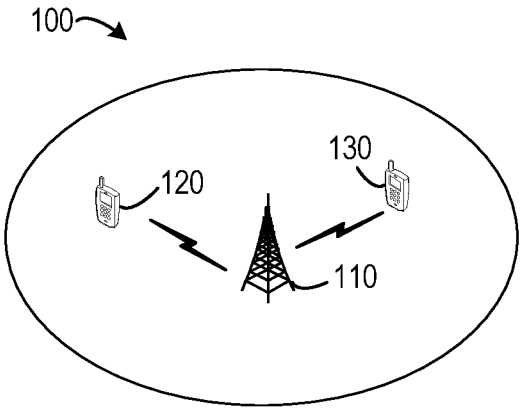

FIG. 1

RECEIVE, FROM A BASE STATION IN THE WIRELESS COMMUNICATION NETWORK, A MESSAGE INCLUDING AN INDICATION OF A PAGING EXTENSION FOR THE TERMINAL DEVICE, THE TERMINAL DEVICE BEING ASSOCIATED WITH A FIRST COVERAGE CLASS — 210

DETERMINE, BASED ON THE MESSAGE, A SECOND COVERAGE CLASS OF A DOWNLINK TRANSMISSION FROM THE BASE STATION TO A FURTHER TERMINAL DEVICE — 220

DETERMINE A TARGET PAGING GROUP FOR THE PAGING EXTENSION BASED ON THE FIRST COVERAGE CLASS AND THE SECOND COVERAGE CLASS — 230

DOWNLINK COVERAGE CLASS OF
ONGOING BLIND TRANSMISSIONS

DOWNLINK CC OF MS REQUIRING PAGING EXTENSION

|  | CC1 | CC2 | CC3 | CC4 |
|---|---|---|---|---|
| CC1 | PG+2 | PG+4 | PG+8 | PG+8 |
| CC2 | - | PG+32 | PG+32 | PG+24/40 |
| CC3 | - | - | PG+32 | PG+24/40 |
| CC4 | - | - | - | PG+64 |

710 →

DOWNLINK COVERAGE CLASS OF
ONGOING BLIND TRANSMISSIONS

DOWNLINK CC OF MS REQUIRING PAGING EXTENSION

|  | CC1 | CC2 | CC3 | CC4 |
|---|---|---|---|---|
| CC1 | PG+2 | PG+4 | PG+8 | PG+8 |
| CC2 | - | PG+32 (PG + 4) | PG+32 (PG + 4) | PG+24/40 (PG + 2/6) |
| CC3 | - | - | PG+32 (PG + 2) | PG+24/40 (PG + 1/3) |
| CC4 | - | - | - | PG+64 (PG + 2) |

720, 730

METHOD AND DEVICE FOR HANDLING PAGING EXTENSION

CROSS-REFERENCE TO RELATED APPLICATIONS

This application is a divisional of application Ser. No. 15/307,758, filed Oct. 28, 2016, which is a National stage of International Application No. PCT/CN2016/101128, filed Sep. 30, 2016, which claims priority to International Application No. PCT/CN2016/080317, filed Apr. 27, 2016, which are hereby incorporated by reference.

TECHNICAL FIELD

Embodiments of the present disclosure generally relate to the field of communications, and more particularly, to a method and device for handling paging extension.

BACKGROUND

Conventionally, a device that has enabled Extended Coverage (EC)—Global System for Mobile Communications (GSM)—Internet of Things (IoT) operation where Extended Discontinuous Reception (eDRX) is used wakes up to read its nominal paging group according to its negotiated eDRX cycle. As described in 3GPP specifications, if the device does not receive a matching paging message and the EC Page Extension field is included therein, it proceeds as follows:

- If the EC Page Extension field indicates that paging extension is enabled for its downlink coverage class, it shall set its eDRX cycle to the lowest eDRX cycle and attempt to read one additional paging message using the first instance of its nominal paging group (calculated using the lowest eDRX cycle) occurring after the last Time Division Multiple Address (TDMA) frame used to transmit the message indicating that paging extension is enabled.
- If it finds a matching paging message therein, it shall act on that message.
- If paging extension is not enabled or it does not find a matching paging message when attempting to read one additional paging message, it sets its eDRX cycle to the negotiated eDRX cycle, remains in packet idle mode and waits for the next instance of its nominal paging group.

There are multiple issues accompanying the conventional solution with the lowest eDRX cycle. First, the delay of the pages transmitted using paging extension in Base Transceiver Station (BTS) will be from 2 TDMA frames (~9.2 ms) when considering devices using coverage class 1 to as large as about eight 51-multiframe (MF) (~2 sec) when considering devices using coverage class 4.

Second, paging extension will use BTS memory by buffering the pages to be sent using paging extension. The longer the pages are buffered, the more BTS memory will be required. The BTS may discard the buffered pages for paging extension or may discard new received Extended Coverage Common Control Channel (EC-CCCH) messages from Base Station Controller (BSC) if its available buffer space is full.

Third, it is hard for a BTS to predict whether paging extension will be feasible if paging extension maps to a set of TDMA frames that occurs far away from the EC-CCCH TDMA frame under transmission, since the BTS will continue to receive new EC-CCCH messages from BSC before the occurrence of the TDMA frames to be used for paging extension. These new EC-CCCH messages may be prioritized by the BTS and consequently transmitted using a subset of the TDMA frames previously planned to be used for paging extension (in which case a device will fail to read a page message and paging extension fails). In other words, a BTS decision to enable paging extension becomes less likely to result in successfully paging the intended device as the time from the decision to use paging extension until the corresponding planned paging extension increases.

Fourth, EC-CCCH resources may be wasted for the case when there are pages that could be sent in support of paging extension using EC-CCCH blocks that occur before the first instance of a device's nominal paging group (calculated using the lowest eDRX cycle) occurring after the last Time Division Multiple Address (TDMA) frame used to transmit the message indicating that paging extension is enabled.

Fifth, there is no guaranteed gap between the set of Extended Coverage Paging Channel (EC-PCH) blocks (1 EC-PCH block is constructed using the burst information carried by the same timeslot (e.g. timeslot 1) within a pair of consecutive TDMA frames) read to determine that paging extension is enabled and the set of EC-PCH blocks a device determines it needs to read as the first instance of its nominal paging group (calculated using the lowest eDRX cycle) occurring after the last TDMA frame used to transmit the message indicating paging extension is enabled. For example, for Coverage Class 1 (CC1) devices, these two sets of EC-PCH blocks will each consist of 1 EC-PCH block and can occur adjacent to each other (no gap in between), which is not desirable from either a device radio block processing perspective or a BTS page message scheduling perspective.

SUMMARY

In general, embodiments of the present disclosure provide a solution for handling paging extension.

In a first aspect, a method at least partially implemented at a terminal device in a wireless communication network is provided. According to the method, the terminal device in the wireless communication network receives, from a base station in the wireless communication network, a message including an indication of a paging extension for the terminal device. The terminal device is associated with a first coverage class. Based on the message, the terminal device determines a second coverage class of a downlink transmission from the base station to a further terminal device. Then, the terminal device determines a target paging group for the paging extension based on the first coverage class and the second coverage class. The corresponding computer program is also provided.

In one embodiment, receiving the message may comprise: determining, based on the first coverage class, a set of frames for carrying the message; and receiving the message on the set of frames.

In one embodiment, determining the target paging group may comprise: determining, based on the second coverage class, a set of control channel blocks used for the downlink transmission; determining, based on the first coverage class and the set of control channel blocks, a time interval between the receipt of the message and a start of a candidate paging group; and determining, based on the time interval, the target paging group that is non-overlapped with the set of control channel blocks.

In one embodiment, determining the target paging group based on the time interval may comprise: if the terminal device is unready for the paging extension after the time interval, determining a gap for the terminal device to prepare for the paging extension, the gap starting with a control channel block occurring immediately after a last control channel block used by the terminal device for determining that the paging extension is required, and the gap including at least one control channel block; and determining, based on the gap, the target paging group that is non-overlapped with the set of control channel blocks.

In a second aspect, a method at least partially implemented at a base station in a wireless communication network is provided. According to the method, the base station determines whether a paging extension is required for a first terminal device as a result of prioritizing the transmission of a message to a further terminal device with a second coverage class. The first terminal device is associated with a first coverage class. In response to determining that the paging extension is required for the terminal device, the base station transmits a message in a downlink transmission to a further terminal device with a second coverage class. The message includes an indication of the paging extension for the terminal device. Then, the base station determines a target paging group for the paging extension based on the first coverage class and the second coverage class. The corresponding computer program is also provided.

In one embodiment, determining the target paging group comprises: determining, based on the second coverage class, a set of control channel blocks used for the downlink transmission; determining, based on the first coverage class and the set of control channel blocks, a time interval between completing the transmission of the message and a start of a candidate paging group; and determining, based on the time interval, the target paging group that is non-overlapped with the set of control channel blocks.

In one embodiment, determining the target paging group based on the time interval comprises: if the terminal device is unready for the paging extension after the time interval, determining a gap for the terminal device to prepare for the paging extension and determining, based on the gap, the target paging group that is non-overlapped with the set of control channel blocks. The gap starts with a control channel block occurring immediately after a last control channel block used by the terminal device for determining that the paging extension is required, and includes at least one control channel block.

In one embodiment, the method of the second aspect may further include paging the terminal device on the target paging group.

In a third aspect, an apparatus at least partially implemented at a terminal device in a wireless communication network is provided. The apparatus includes a receiving unit and a determining unit. The receiving unit is configured to receive, from a base station in the wireless communication network, a message including an indication of a paging extension for the terminal device. The terminal device is associated with a first coverage class. The determining unit is configured to, determine, based on the message, a second coverage class of a downlink transmission from the base station to a further terminal device and to determine a target paging group for the paging extension based on the first coverage class and the second coverage class.

In a fourth aspect, an apparatus at least partially implemented at a base station in a wireless communication network is provided. The apparatus includes a determining unit and a transmitting unit. The determining unit is configured to determine whether a paging extension is required for a first terminal device as a result of prioritizing the transmission of a message to a further terminal device with a second coverage class. The first terminal device being associated with a first coverage class. The transmitting unit is configured to, in response to determining that the paging extension is required for the terminal device, transmit a message in a downlink transmission to a further terminal device with a second coverage class. The message includes an indication of the paging extension for the first terminal device. The determining unit is further configured to determine a target paging group for the paging extension based on the first coverage class and the second coverage class.

In a fifth aspect, a device is provided. The device includes a processor and a memory. The memory contains instructions executable by the processor, whereby the processor being adapted to cause the device to: receive, from a base station in the wireless communication network, a message including an indication of a paging extension for the terminal device, the terminal device being associated with a first coverage class; determine, based on the message, a second coverage class of a downlink transmission from the base station to a further terminal device; and determine a target paging group for the paging extension based on the first coverage class and the second coverage class.

In a sixth aspect, a device is provided. The device includes a processor and a memory. The memory contains instructions executable by the processor, whereby the processor being adapted to cause the terminal device to: determine whether a paging extension is required for a terminal device, the terminal device being associated with a first coverage class; in response to determining that the paging extension is required for the terminal device, determine a target paging group for the paging extension based on the first coverage class and the second coverage class.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 1 shows an environment of a wireless communication network 100 in which embodiments of the present disclosure may be implemented;

FIG. 2 shows a flowchart of a method 200 for handling paging extension implemented by a terminal device in accordance with an embodiment of the present disclosure;

DETAILED DESCRIPTION

Figure 3:
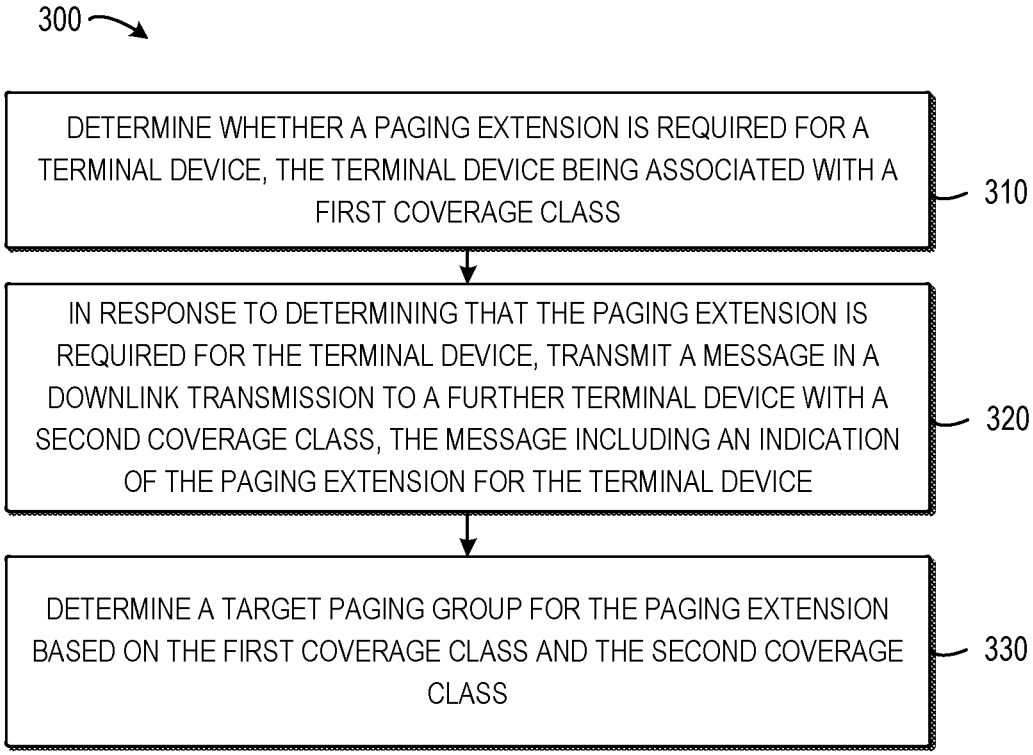
FIG. 3 shows a flowchart of a method 300 for handling paging extension implemented by a base station in accordance with an embodiment of the present disclosure.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future generation (e.g. 5G) communication protocols, and/or any other protocols either currently known or to be developed in the future.

The term "base station (BS)" refers to a BTS, an access point (AP), and any other suitable network device in the wireless communication network. The network device may be, for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" refers to user equipment (UE), which may be a Subscriber Station (SS), a Portable Subscriber Station, a Mobile Station (MS), or an Access Terminal (AT). The terminal device may include, but not limited to, a mobile phone, a cellular phone, a smart phone, a tablet, a wearable device, a personal digital assistant (PDA), and the like.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Now some exemplary embodiments of the present disclosure will be described below with reference to the figures. Reference is first made to FIG. 1, which illustrates an environment of a wireless communication network 100 in which embodiments of the present disclosure may be implemented. As shown in the wireless communication network 100, there are a BS 110 and two terminal devices 120 and 130. The base station 110 may page any of the terminal devices 120 and 130, and downlink transmission may be performed from the BS 110 to any of the terminal devices 120 and 130. For purpose of discussion, the base station or the BS is also referred to as "BTS", the terminal device 120 is also referred to as MS 120 or MSa, and the terminal device 130 is also referred to as MS 130 or MSb hereafter.

It is to be understood that the configuration of FIG. 1 is described merely for the purpose of illustration, without suggesting any limitation as to the scope of the present disclosure. Those skilled in the art will appreciate that the wireless communication network 100 may include any suitable number of terminal devices and BSs and may have other suitable configurations.

As discussed, multiple issues accompany the conventional solutions. In order to solve one or more of the above and other potential problems, embodiments of the present disclosure provide solutions on handling paging extension for EC-GSM-IoT. In accordance with embodiments of the present disclosure, upon detecting that page extension is required, a MS shall use the next paging group corresponding to its downlink CC that (a) occurs after a gap of at least X (X=0, 1, 2, . . . ) EC-PCH blocks following the last EC-PCH/EC-AGCH block it reads to determine that page extension is required and (b) does not overlap with any additional EC-PCH/EC-AGCH blocks which it knows are being used to send a message to another MS of the same or higher downlink CC.

FIG. 2 shows a flowchart of a method 200 for handling paging extension implemented by a terminal device in accordance with an embodiment of the present disclosure. With the method 200, one or more of the above and other potential deficiencies in the conventional approaches can be overcome. It would be appreciated by those skilled in the art that the method 200 may be implemented at a terminal device, such as the terminal device 120, the terminal device 130 or other suitable devices. For the purpose of illustration, the method 300 will be described below with reference to the terminal device 120 in the wireless communication system 100.

The method 200 is entered in block 210, where a message including an indication of a paging extension for the terminal device is received from a base station in the wireless communication network. The terminal device is associated with a first coverage class (CC). The coverage class indicates radio signal quality of downlink transmission to a terminal device and may be divided into several levels, for example, CC1 to CC4. In some embodiments, CC1 indicates a better radio signal quality than CC4. In some embodiments, in block 210, a set of frames for carrying the message may be determined based on the first coverage class, and the message may be received on the set of frames.

In block 220, a second coverage class of a downlink transmission from the base station to a further terminal device is determined based on the message. Then, the terminal device may determine, based on the message, that itself is not addressed by the message. In some embodiments, the terminal device may determine that the message is being sent to a further terminal device based on the content of the message.

Next, in block 230, a target paging group for said paging extension is determined based on said first coverage class and said second coverage class. The paging group (PG)

represents a set of control channel blocks for a terminal device to listen to signals. More details of the term of paging group may be found in 3GPP TS 45.002, Version 13.2.0. In the embodiments of the present disclosure, the target paging group represents a set of control channel blocks for handling paging extension.

In some embodiments, a set of control channel blocks used for the downlink transmission may be determined based on the second coverage class. In an embodiment, the set of control channel blocks may include the set of frames used for receiving the message according to the first coverage class. For example, a specific message sent using X repetitions for a wireless device having a second coverage class may be received using just Y of those X repetitions by a wireless device having a first coverage class (i.e. Y is less than X). The control channel block may be, but not limited to, an extended coverage common control channel (EC-CCCH) block. In some embodiments, the control channel block may be an Extended Coverage Paging Channel (EC-PCH)/Extended Coverage Access Grant Channel (EC-AGCH) block, or the like. Next, a time interval between the receipt of the message and a start of a candidate paging group may be determined based on the first coverage class and the set of control channel blocks. In the embodiments, the receipt of the message may indicate a time point of completing the receipt of the message. The candidate paging group may indicate a paging group that is a candidate for the target paging group and that may be determined according to the first coverage class. In some embodiments, if the terminal device is ready for the paging extension after the time interval, the candidate paging group may be determined as the target paging group. The terminal device may require, based on the time interval, that the target paging group does not overlap with the set of control channel blocks. Then, the target paging group that is non-overlapped with the set of control channel blocks may be determined based on the time interval.

According to embodiments of the present disclosure, the target paging group may be determined in several ways. In an embodiment, if the terminal device is unready for the paging extension after the time interval, a gap is determined for the terminal device to prepare for the paging extension. The gap may start with a control channel block occurring immediately after a last control channel block used by the terminal device for determining that the paging extension is required, and may include at least one control channel block. Then, the target paging group that is non-overlapped with the set of control channel blocks may be determined based on the gap.

As discussed above, according to embodiments of the present disclosure, multiple advantages can be achieved. For example, BTS will use less time to send the page messages associated with paging extension, and MS will use less time to receive the page messages accordingly. Using this solution for paging extension, for example, the delay could be as small as 4 TDMA frames (when a gap of 1 EC-PCH block is used) or as large as about 4 51-MF.

Load of EC-CCCH in BTS can be better balanced, since paging extension could occur using a set of one or more EC-PCH blocks (following the EC-PCH block(s) of the nominal paging group of a MS) that satisfy the rules defining where coverage class specific EC-PCH blocks can be located and where the first of these EC-PCH blocks occurs after a gap of at least 2 TDMA frames relative to the last EC-PCH/EC-AGCH block used to send the message that indicates paging extension is to be used. Thus, BTS can fully use the EC-CCCH on air interface.

For lower coverage classes, the maximum time until their corresponding paging extension is reduced, thereby allowing the BTS to use the paging extension feature to send the originally intended page messages more consistently.

Further, BTS will also reduce the amount of memory required for buffering the page messages which are to be transmitted according to paging extension by the BTS. The possibility of having to discard EC-CCCH messages in BTS will be decreased.

Still further, by ensuring a minimum gap between the last EC-PCH/EC-AGCH block read by a MS to determine that paging extension is to be used and the first possible EC-PCH block read by the MS to check if a corresponding page message has been received using paging extension, the MS will have enough time (after reading the last EC-PCH block of its nominal paging group) to determine if it needs to prepare for page message reception using paging extension.

Reference is now made to FIG. 3, which shows a flowchart of a method 300 for handling paging extension in accordance with an embodiment of the present disclosure. It would be appreciated by those skilled in the art that the method 300 may be implemented by a network device, such as the BS 110 or other suitable devices. In embodiments of FIG. 3, the base station determines whether a paging extension is required for a first terminal device based on a decision to prioritize the transmission of a message to a further terminal device with a second coverage class. The first terminal device is associated with a first coverage class. In response to determining that the paging extension is required for the terminal device, the base station transmits a message in a downlink transmission to a further terminal device with a second coverage class. The message includes an indication of the paging extension for the first terminal device. Then, the base station determines a target paging group for the paging extension based on the first coverage class and the second coverage class.

The method 300 is entered in block 310, where whether a paging extension is required for a terminal device is determined. The terminal device is associated with a first coverage class. If the paging extension is required, then in block 320, a message is transmitted in a downlink transmission to a further terminal device with a second coverage class. The message includes an indication of the paging extension for the terminal device. In block 330, a target paging group may be determined for the paging extension based on the first coverage class and the second coverage class.

According to embodiments of the present disclosure, the target paging group may be determined in several ways. In some embodiments, a set of control channel blocks used for the downlink transmission may be determined based on the second coverage class. The set of control channel blocks may include the set of frames used for transmitting the message according to the first coverage class. The control channel block may be, but not limited to, an EC-CCCH block, for example, an EC-PCH/EC-AGCH block. Next, a time interval between completing the transmission of the message and a start of a candidate paging group may be determined based on the first coverage class and the set of control channel blocks. The BS may require, based on the time interval, that the target paging group does not overlap with the set of control channel blocks. Then, the target paging group that is non-overlapped with the set of control channel blocks may be determined based on the time interval.

In an embodiment, if the terminal device is unready for the paging extension after the time interval, a gap is determined for the terminal device to prepare for the paging extension. The gap may start with a control channel block occurring immediately after a last control channel block used by the terminal device for determining that the paging extension is required, and may include at least one control channel block. Then, the target paging group that is non-overlapped with the set of control channel blocks may be determined based on the gap.

Additionally, in some embodiments, the base station may page the terminal device on the target paging group, e.g. by sending a paging message to that terminal device.

In accordance with embodiments of the present invention, the interactions between the terminal device and the base station may be implemented in several ways. In some embodiments, BTS determines ongoing blind transmissions on EC-CCCH and so knows the downlink coverage class of the terminal device targeted by a given set of control channel blocks. Then, the BTS determines pages that require paging extension and knows their Downlink Coverage Classes. EC Page Extension field of EC-CCCH message is set accordingly in BTS based on the Downlink Coverage Classes of the pages that require paging extension. BTS may also determine the target paging group for paging extension for the MS that requires paging extension.

An EC-CCCH message with EC Page Extension Field is sent by BTS on air interface during the blind transmissions used for a given set of control channel blocks. MS receives corresponding repetitions of bursts according to its paging group and downlink coverage class. The MS will decode the downlink EC-CCCH message and check if the downlink EC-CCCH message is directed for it or not. If the EC-CCCH message is not directed for it, the MS will check the EC Page Extension Field from the received downlink EC-CCCH message. If EC Page Extension Field indicates that paging extension is required for the MS, the MS shall also get the downlink coverage class of the terminal device targeted by the ongoing blind transmissions from the received EC-CCCH message and will monitor the paging group for paging extension according to FIG. 7A or 7B based on its downlink coverage class and also on the downlink coverage class of the terminal device targeted by the ongoing blind transmissions. When paging group for paging extension is scheduled in BTS, the BTS will try to send pages that require paging extension on corresponding paging group for paging extension for the MS. The MS will receive the pages on the paging group for paging extension, if the BTS sends the pages on the paging group for paging extension during the scheduling.

Figures 7A, 7B, 8:
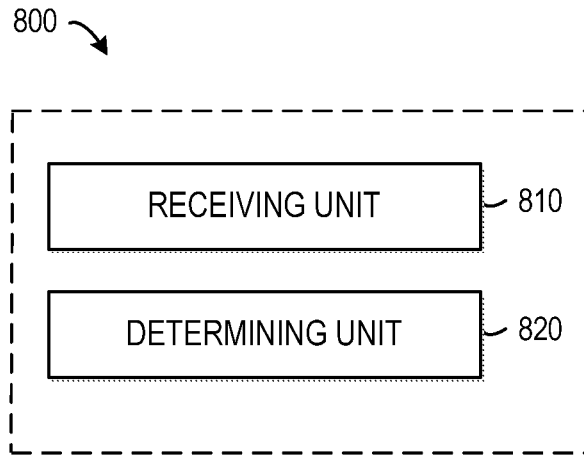
FIG. 7A shows a diagram 700 of determined target paging groups in accordance with embodiments of the present disclosure.
FIG. 7B shows a diagram 710 of determined target paging groups in accordance with embodiments of the present disclosure.
FIG. 8 shows a block diagram of a terminal device 800 in accordance with an embodiment of the present disclosure.

In FIG. 7B, a PG represents the first CC1 EC-PCH block in the set of CC1 EC-PCH blocks comprising the nominal paging group of an MS attempting to read a page (i.e. when viewing non CC1 paging blocks as being composed of a set of CC1 paging blocks). It is to be understood that the location of the start of the first EC-PCH block used for page extension is expressed as an offset relative to PG and is based on CC1 EC-PCH blocks (i.e. 1 EC-PCH block is sent on one timeslot using 2 TDMA frames). The parenthetical number in each of the columns indicates the offset relative to PG expressed in terms of EC-PCH blocks applicable to the CC being used by the MS experiencing page extension (e.g. a CC2 MS that detects a page extension condition when a EC-PCH/EC-AGCH message is being sent to a CC3 MS applies an offset of 4 CC2 EC-PCH blocks).

In embodiments as shown in FIG. 7B, in block 720, Page Extension is determined using PG+24 when a CC2 MS requires page extension if it determines that a CC4 page is ongoing from TDMA frames 35 to 50 on multiframe N/N+1/N+2/N+3. Page Extension is determined using PG+40 when a CC2 MS requires page extension if it determines that a CC4 page is ongoing from TDMA frames 19 to 34 on MF N/N+1/N+2/N+3.

In block 730, Page Extension is determined using PG+24 when a CC3 MS requires page extension if it determines that a CC4 page is ongoing from TDMA frames 35 to 50 on MF N/N+1/N+2/N+3. Page Extension is determined using PG+40 when a CC3 MS requires page extension if it determines that a CC4 page is ongoing from TDMA frames 19 to 34 on MF N/N+1/N+2/N+3.

For example, an MS has selected CC1 and is monitoring B5 (FN [29, 30]) as its nominal paging group when it determines that a message is being sent to CC4 and page extension is enabled for CC1. (The FN refers to the frame number.) It responds by adding an offset of 8 CC1 EC-PCH blocks to arrive at B13 as CC1 EC-PCH block it uses for page extension.

Paging Extension could be scheduled to occur as soon as possible after the BTS determines an available page message could not be sent. When scheduling the use of paging extension, the BTS takes into account the downlink coverage class of the available page message, the downlink coverage class associated with the ongoing blind transmission on the EC-PCH/EC-AGCH and the need for a minimal gap between the last EC-PCH/EC-AGCH block used for the last of the ongoing blind transmissions and the first EC-PCH block used for paging extension.

A gap can be specified as having a size of X (X=0, 1, 2 ...) EC-PCH blocks that starts following the last EC-PCH/EC-AGCH block a MS reads to determine that it needs to apply paging extension. The gap shall be suitable from the BTS perspective, such that BTS can transmit any page message that needs to be sent with paging extension by using a set of TDMA frames that are valid according to the downlink coverage class of the MS for which the paging extension is performed. The gap also shall not overlap the remaining ongoing EC-PCH/EC-AGCH blocks being used to send a message according to the downlink coverage class of the MS that is the targeted recipient of the message. From the perspective of an MS that does not receive a page message in its nominal paging group, the gap should be long enough such that it can determine if paging extension is enabled for its downlink coverage class before the first EC-PCH block of a potential paging extension occurs for that downlink coverage class. A gap of 1 EC-PCH block (i.e. 2 full TDMA frames) is considered to be sufficient for all MSs for all scenarios considered herein but a longer gap could also be seen as the minimum required for all MSs.

Embodiment 1: Downlink Coverage Class of Page Messages Subject to Paging Extension<Downlink Coverage Class Associated with Ongoing Blind Transmissions Details of an example of Embodiment 1 (also referred to as "sub-embodiment 1" hereafter) will be discussed below. In sub-embodiment 1, gap is not required for normal cases. It is to be understood that the sub-embodiment 1 is an example of Embodiment 1, which is described for purpose of discussion, rather than limitation.

When downlink coverage class of page messages to be sent using paging extension is <downlink coverage class of ongoing blind transmissions, there are cases that a gap is not required for paging extension (i.e. there is a built in spacing between the last ongoing blind transmission it reads to determine that paging extension is enabled for its coverage class and where it knows the paging extension occurs, so no gap is needed).

Figure 4:
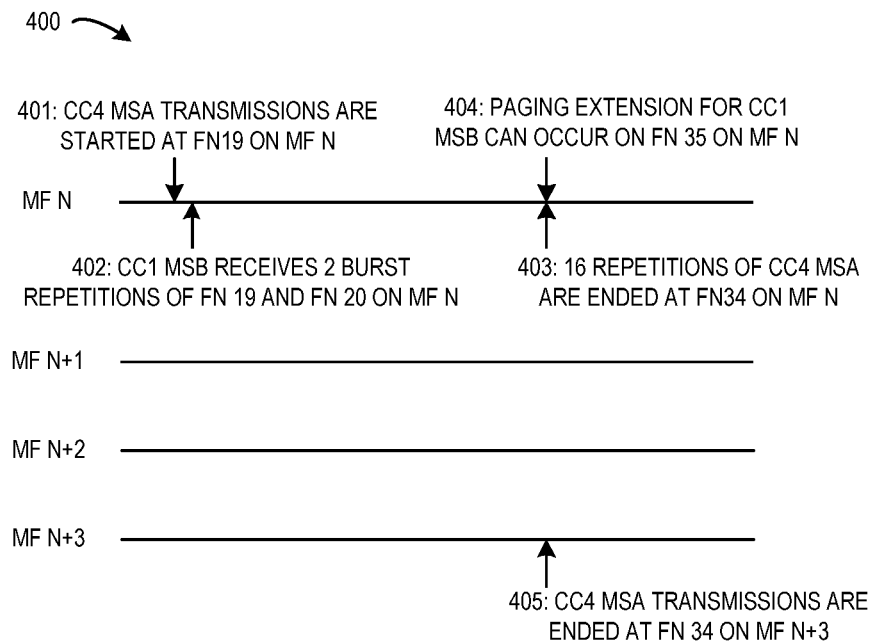
FIG. 4 shows a diagram 400 of a paging extension procedure in accordance with an embodiment of the present disclosure.

FIG. 4 is an example, CC1 MSb which reads TDMA Frame 19 and 20 on MF N as its nominal paging group can apply paging extension on TDMA frame 35 on MF N, once it realizes there is an ongoing blind transmission for a CC4 MSa.

At 401, ongoing blind transmissions of CC4 MSa are started on TDMA frame 19 on MF N.

At 402, CC1 MSb reads 2 burst repetitions (1 EC-PCH block) occurring on TDMA frames 19 and 20 on MF N according to its nominal paging group, and can thereby decode the received EC-CCCH message to get the downlink coverage class of ongoing blind transmission. CC1 MSb will then know that blind transmissions of CC4 MSa will be ended at TDMA frame 34 on MF N.

At 403, 16 repetitions of CC4 MSa will end at TDMA frame 34 on MF N.

At 404, paging extension for CC1 MSb can start on TDMA frame 35 on MF N. The BTS is able to transmit a page message for CC1 MSb on TDMA frames 35 and 36 after all ongoing blind transmissions sent for a CC4 MSa on MF N, and CC1 MSb can be ready for paging extension on TDMA frame 35 on MF N since there is already a gap of several EC-PCH blocks after CC1 MSb receives the EC-CCCH message (according to its nominal paging) at TDMA frames 19 and 20.

At 405, CC4 MSa transmissions are ended at FN 34 on MF N+3.

Details of another example of Embodiment 1 (also referred to as "sub-embodiment 2" hereafter) will be discussed below. In sub-embodiment 2, a gap is required for special cases. It is to be understood that the sub-embodiment 2 is an example of Embodiment 1, which is described for purpose of discussion, rather than limitation.

When the MS has to read the last repetition of an ongoing blind transmission, a gap of X (X=0, 1, 2, . . . ) EC-PCH blocks is required so that the MS will be ready for the paging extension and the BTS will have time to schedule the paging message according to the downlink coverage class required for the paging extension.

A) For example, FIG. 4 illustrates that CC4 MSa blind transmissions are ongoing and CC1 MSb is for paging extension. If a CC4 blind transmission is ongoing to MSa and the nominal paging group of the CC1 MSb occurs within the last 2 burst repetitions used on MF N for the ongoing CC4 blind transmissions (i.e. in TDMA frames 33 and 34 of the ongoing blind transmissions), CC1 MSb requires a minimum gap of 1 EC-PCH block to be ready for paging extension. As such, in this case, the paging extension can start with a burst in TDMA frame 37 on MF N.

Figure 5:
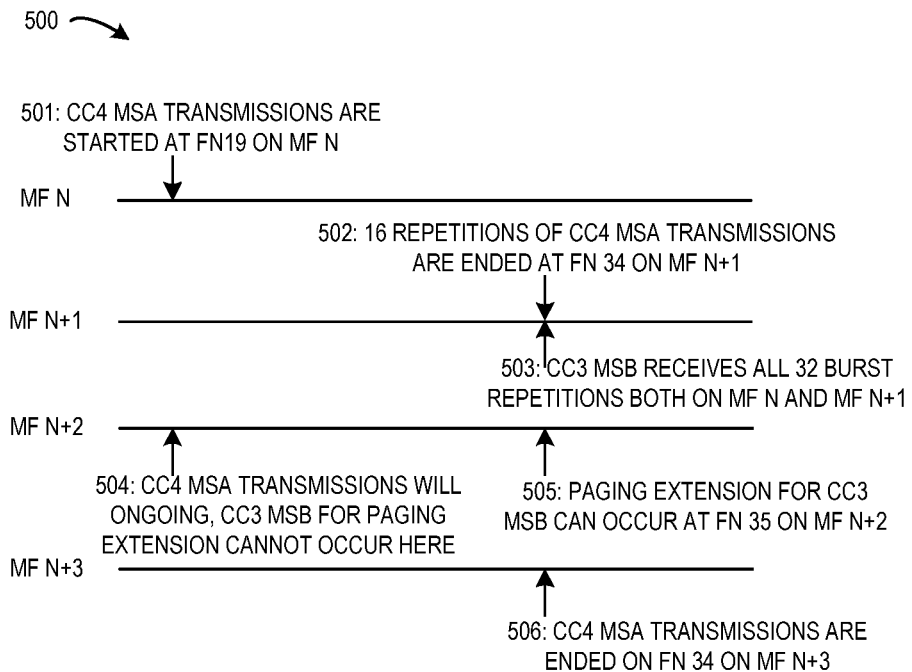
FIG. 5 shows a diagram 500 of a paging extension procedure in accordance with an embodiment of the present disclosure.

B) FIG. 5 is an example where a CC4 blind transmission is ongoing for MSa when scheduling a CC3 page message using paging extension becomes necessary for MSb. In this case, the paging extension can at earliest happen at TDMA frame 35 on MF N+2. This is because the CC3 MSb needs at least one EC-PCH block (after reading its nominal paging group) to be ready for paging extension after receiving the last of the CC4 blind transmissions sent using MF N+1 at TDMA frame 34. As such, the earliest a CC3 paging extension can occur will be in MF N+2. The earliest location within MF N+2 that the paging extension can occur for MSb is in FN 35 since FN 19 through FN 34 of this MF will be used for sending the CC4 blind transmissions specific to MSa.

In particular, at 501, CC4 MSa transmissions are started at FN19 on MF N.

At 502, 16 repetitions of CC4 MSa transmissions are ended at FN 34 on MF N+1.

At 503, CC3 MSb receives all 32 burst repetitions both on MF N and MF N+1.

At 504, CC4 MSa transmissions will be ongoing, CC3 MSb for paging extension cannot occur here.

At 505, paging extension for CC3 MSb can occur at FN 35 on MF N+2.

At 506, CC4 MSa transmissions are ended at FN 34 on MF N+3.

Embodiment 2: Downlink Coverage Class of page messages subject to paging extension=Downlink Coverage Class associated with ongoing blind transmissions A minimum gap with X (X=0, 1, 2, . . . ) EC-PCH blocks is required because a MS has to read all repetitions of ongoing blind transmissions of a message sent to another MS having the same downlink coverage class. The minimum gap is required so that MS can know if paging extension is enabled or not and therefore only be ready for paging extension if it has been enabled for its downlink coverage class.

Figure 6:
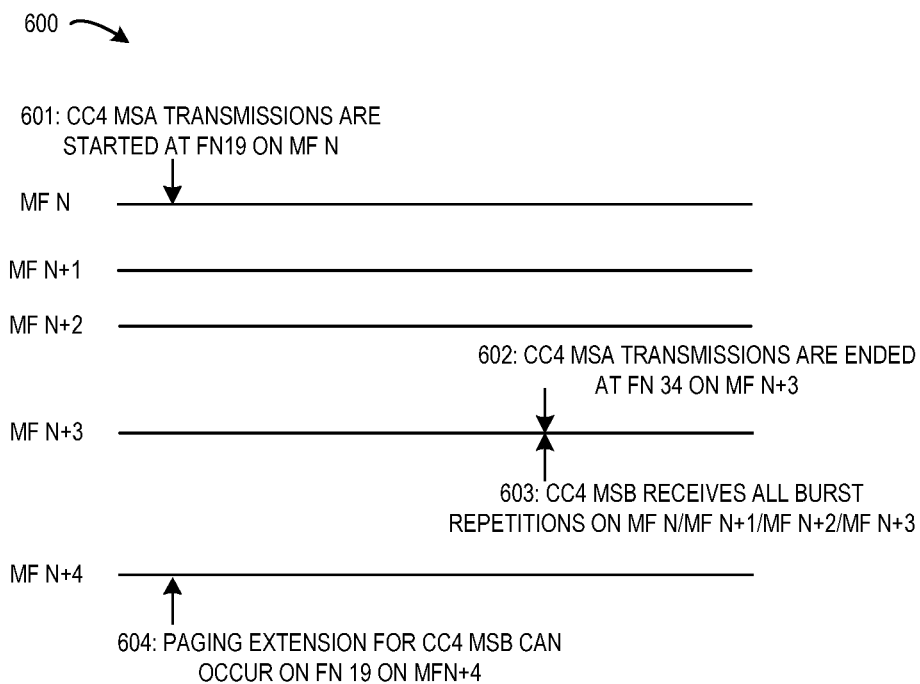
FIG. 6 shows a diagram 600 of a paging extension procedure in accordance with an embodiment of the present disclosure.

For example, in FIG. 6 which illustrates that CC4 MSa blind transmissions are ongoing and CC4 MSb is for paging extension, after a CC4 MSb reads the last of the blind transmissions at TDMA frame 34 on MF N+3 according to its nominal paging group, it determines that the message sent therein is associated with another CC4 MSa and that paging extension is enabled for CC4. CC4 MSb requires a gap of 8 EC-PCH Blocks to be ready for paging extension at TDMA frame 19 on MF N+4.

At 601, CC4 MSa transmissions are started at FN19 on MF N.

At 602, CC4 MSa transmissions are ended at FN 34 on MF N+3.

At 603, CC4 MSb receives all burst repetitions on MF N/MF N+1/MF N+2/MF N+3.

At 604, paging extension for CC4 MSb can occur on FN 19 on MFN+4.

Embodiment 3: Suggested Optional Improvements when considering implementation

In consideration of defining a static relationship between paging group extension and paging group to make BTS and MS easier to implement, following optional improvements are suggested:

A) When blind transmissions for a MS having a higher downlink coverage class are ongoing and a CC1 MS requires paging extension, there is a possibility that several CC1 MS reading different TDMA frames associated with their nominal paging group will have the need for paging group extension.

For example, in FIG. 4, 7 CC1 mobile stations that have their nominal paging group starting on MF N at TDMA frames 19, 21, 23, 25, 27, 29, 31 respectively can use the same set of TDMA frames for paging extension (i.e. FN 35 and 36 of MF N).

But EC-PCH can only send a page message indicating up to 2 TMSI using paging extension. In order to avoid making these CC1 MSs use the same instance of paging group extension, Paging Group Extension can be defined so that each of the MSs takes into account where its nominal paging group occurred when determining which additional paging group it should read when using paging group extension.

So in the example of FIG. 1, if CC1 MS on MF N reads TDMA frames 19 and 20 as its nominal paging group then it can have its corresponding paging extension occur at TDMA frames 35 and 36 on MF N, if CC1 MS on MF N reads TDMA frames 21 and 22 as its nominal paging group then it can have its corresponding paging extension occur at TDMA frames 37 and 38 on MF N, if CC1 MS on MF N reads TDMA frames 23 and 24 as its nominal paging group then it can have its corresponding paging extension occur at TDMA frames 39 and 40 on MF N, and so on.

B) For all the MSs who have the same downlink coverage class and require paging extension when blind transmissions are ongoing for a MS having the same or higher downlink coverage class, Paging Group Extension could be defined so that BTS and MS can have a static relationship between the paging group read due to paging extension and the nominal paging group of the MS in order to make BTS and all MSs easier to implement and work well.

For example, when blind transmissions for a CC4 MSa are ongoing and a CC3 MSb requires paging extension as per FIG. 5, CC3 MSb who starts to read burst repetitions starting from TDMA frame 19 on MF N+2 according to its nominal paging group can have its paging extension start at TDMA frame 19 on MF N+4.

But in this case, paging extension is suggested to start at TDMA frame 35 on MF N+4, so that all the CC3 MSs from different nominal paging groups that occur during the CC4 blind transmissions can be handled using a static relationship between nominal paging group and paging group extension. For example, if a CC3 MS reads TDMA frames 19 to 34 on MF N and MF N+1 as its nominal paging group then it can have its corresponding paging extension occur at TDMA frames 35 to 50 on MF N+2 and N+3, if a CC3 MS reads TDMA frames 19 to 34 on MF N+2 and MF N+3 as its nominal paging group then it can have its corresponding paging extension occur at TDMA frames 35 to 50 on MF N+4 and N+5, and so on.

When a CC3 MS that reads TDMA frames 35 to 50 on MF N and MF N+1 as its nominal paging group when it determines that a CC4 page is ongoing from TDMA frames 35 to 50 on MF N/N+1/N+2/N+3, it can have its corresponding paging extension occur at TDMA frames 19 to 34 on MF N+2 and N+3. If a CC3 MS reads TDMA frames 35 to 50 on MF N+2 and MF N+3 as its nominal paging group then it can have its corresponding paging extension occur at TDMA frames 19 to 34 on MF N+4 and N+5.

After these optional improvements, Paging Group Extension could be statically defined as in FIG. 7A which would be very easy to be implemented in BTS since BTS and MS only care about the downlink coverage classes of the available page message and the downlink coverage class associated with the ongoing blind transmissions on the EC-PCH/EC-AGCH.

FIG. 7A shows a diagram 700 of determined target paging groups in accordance with embodiments of the present disclosure. The diagram 700 shows ways of calculating Paging Group Extension (in EC-PCH blocks) according to a PG after optional improvements. The PG represents the first CC1 EC-PCH block in the set of CC1 EC-PCH blocks comprising the nominal paging group of an MS attempting to read a page (i.e. when viewing non CC1 paging blocks as being composed of a set of CC1 paging blocks). It is to be understood that the location of the start of the first EC-PCH block used for page extension is expressed as an offset relative to PG and is based on CC1 EC-PCH blocks (i.e. 1 EC-PCH block is sent on one timeslot using 2 TDMA frames).

In an example of FIG. 7A, if the Downlink Coverage Class of Blind Transmissions is CC4 and Downlink CC of Pages for Paging Extension is CC2, Page Group Extension is determined using PG+24 when a CC2 MS requires paging extension, if it determines that a CC4 page is ongoing from TDMA frames 35 to 50 on MF N/N+1/N+2/N+3. Paging Group Extension is determined using PG+40 when a CC2 MS requires paging extension, if it determines that a CC4 page is ongoing from TDMA frames 19 to 34 on MF N/N+1/N+2/N+3.

In another example, if the Downlink Coverage Class of Blind Transmissions is CC4 and Downlink CC of Pages for Paging Extension is CC3, Paging Group Extension is Paging Group+24 when a CC3 MS requires paging extension, if it determines that a CC4 page is ongoing from TDMA frames 35 to 50 on MF N/N+1/N+2/N+3. Paging Group Extension is Paging Group+40 when a CC3 MS requires paging extension, if it determines that a CC4 page is ongoing from TDMA frames 19 to 34 on MF N/N+1/N+2/N+3.

According to embodiments of the present disclosure, upon detecting that paging extension is required, a MS shall use the next paging group corresponding to its downlink CC that (a) occurs after a gap of at least X (X=0, 1, 2, . . . ) EC-PCH Blocks following the last EC-PCH/EC-AGCH block it reads to determine that paging extension is required and (b) does not overlap with any additional EC-PCH/EC-AGCH blocks which it knows are being used to send a message to another MS of the same or higher downlink CC.

With the embodiments of the present disclosure, the statically defined Paging Group Extension based on the downlink coverage classes of the available page message and the downlink coverage class associated with the ongoing blind transmissions on the EC-PCH/EC-AGCH would be easy for BTS and MS to implement.

FIG. 8 shows a block diagram of a device 800 in accordance with an embodiment of the present disclosure. It would be appreciated that the device 800 may be implemented at the terminal device 120 as shown in FIG. 1 or other suitable devices.

As shown, the device 800 includes a receiving unit 810 and a determining unit 820. The receiving unit 810 is configured to receive, from a base station in the wireless communication network, a message including an indication of a paging extension for the terminal device, the terminal device being associated with a first coverage class. The determining unit 820 is configured to, determine, based on the message, a second coverage class of a downlink transmission from the base station to a further terminal device; and determine a target paging group for the paging extension based on the first coverage class and the second coverage class.

In an embodiment, the receiving unit 810 may be further configured to: determine, based on the first coverage class, a set of frames for carrying the message; and receive the message on the set of frames.

In an embodiment, the determining unit 820 may be further configured to:
  determine, based on the second coverage class, a set of control channel blocks used for the downlink transmission; determine, based on the first coverage class and the set of control channel blocks, a time interval between the receipt of the message and a start of a candidate paging group; and determine, based on the time interval, the target paging group that is non-overlapped with the set of control channel blocks.

In an embodiment, the determining unit 820 may be further configured to: if the terminal device is unready for the paging extension after the time interval, determine a gap for the terminal device to prepare for the paging extension, the gap starting with a control channel block occurring immediately after a last control channel block used by the terminal device for determining that the paging extension is required, and the gap including at least one control channel block; and determine, based on the gap, the target paging group that is non-overlapped with the set of control channel blocks.

Figure 9:
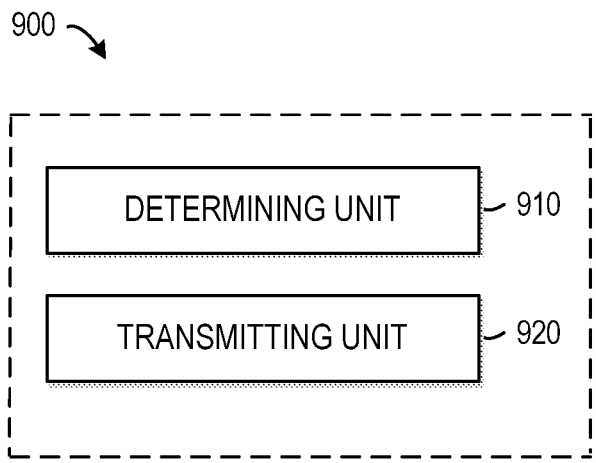
FIG. 9 shows a block diagram of a base station 900 in accordance with an embodiment of the present disclosure.

FIG. 9 shows a block diagram of a device 900 in accordance with an embodiment of the present disclosure. It would be appreciated that the device 900 may be implemented at the BS 110 as shown in FIG. 1 or other suitable devices.

As shown, the device 900 includes a determining unit 910 and a transmitting unit 920. The determining unit 910 is configured to determine whether a paging extension is required for a terminal device, the terminal device being associated with a first coverage class. The transmitting unit 920 is configured to, in response to the determining unit 910 determining that the paging extension is required for the terminal device, transmit a message in a downlink transmission to a further terminal device with a second coverage class, the message including an indication of the paging extension for the terminal device. The determining unit 910 is further configured to determine a target paging group for the paging extension based on the first coverage class and the second coverage class.

In an embodiment, the determining unit 910 may be further configured to:
determine, based on the second coverage class, a set of control channel blocks used for the downlink transmission; determine, based on the first coverage class and the set of control channel blocks, a time interval between completing the transmission of the message and a start of a candidate paging group; and determine, based on the time interval, the target paging group that is non-overlapped with the set of control channel blocks.

In an embodiment, the determining unit 910 may be further configured to: if the terminal device is unready for the paging extension after the time interval, determine a gap for the terminal device to prepare for the paging extension, the gap starting with a control channel block occurring immediately after a last control channel block used by the terminal device for determining that the paging extension is required, and the gap including at least one control channel block; and determine, based on the gap, the target paging group that is non-overlapped with the set of control channel blocks.

In an embodiment, the device 900 may further include a paging unit (not shown) configured to page the terminal device on the target paging group.

It should be appreciated that components included in the device 800 correspond to the blocks of the method 200, and components included in the device 900 correspond to the blocks of the method 300. Therefore, all operations and features described above with reference to FIG. 2 are likewise applicable to the components included in the device 800 and have similar effects, and all operations and features described above with reference to FIG. 3 are likewise applicable to the components included in the device 900 and have similar effects. For the purpose of simplification, the details will be omitted.

The components included in the device 800 and the device 900 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the device 800 and the device 900 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 10:
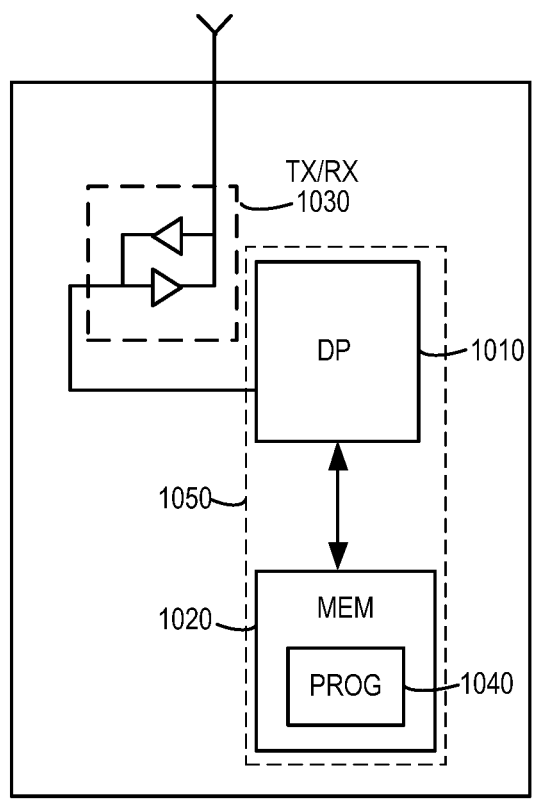
FIG. 10 shows a simplified block diagram 1000 of a device that is suitable for use in implementing embodiments of the present disclosure.

FIG. 10 shows a simplified block diagram of a device 1000 that is suitable for use in implementing embodiments of the present disclosure. It would be appreciated that the device 1000 may be implemented at, for example, the BS 110, the terminal device 120, the terminal device 130 or other suitable devices.

As shown, the device 1000 includes a data processor (DP) 1010, a memory (MEM) 1020 coupled to the DP 1010, and a suitable RF transmitter TX and receiver RX 1030 coupled to the DP 1010. The MEM 1020 stores a program (PROG) 1040. The TX/RX 1030 is for bidirectional wireless communications. It is to be understood that the TX/RX 1030 has at least one antenna to facilitate communication, though in practice an Access Node mentioned in this application may have several ones.

The PROG 1040 is assumed to include program instructions that, when executed by the associated DP 1010, enable the device 1000 to operate in accordance with the embodiments of the present disclosure, as discussed herein with the method 200 in FIG. 2 or the method 300 in FIG. 3. The embodiments herein may be implemented by computer software executable by the DP 1010 of the device 1000, or by hardware, or by a combination of software and hardware. A combination of the data processor 1010 and MEM 1020 may form processing means 1050 adapted to implement various embodiments of the present disclosure.

The MEM 1020 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 1000, there may be several physically distinct memory modules in the device 1000. The DP 1010 may be of any type suitable to the local technical environment, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method in a base station of a wireless communication network, comprising:
   determining whether a paging extension to a paging group is required for a terminal device, the terminal device being associated with a first coverage class;
   in response to determining that the paging extension is required for the terminal device, transmitting a message in a downlink transmission to a further terminal device with a second coverage class, the message including an indication of the paging extension for the terminal device; and
   determining a target paging group for the paging extension by determining an offset from the paging group, wherein the offset is determined based on the first coverage class and the second coverage class.

2. The method according to claim 1, wherein determining the target paging group further comprises:
   determining, based on the second coverage class, a set of control channel blocks used for the downlink transmission;
   determining, based on the first coverage class and the set of control channel blocks, a time interval between completing the transmission of the message and a start of a candidate paging group, the time interval comprising the offset; and
   determining, based on the time interval, the target paging group that is non-overlapped with the set of control channel blocks.

3. The method according to claim 2, wherein the determining the target paging group based on the time interval further comprises:
   when the terminal device is deemed not ready for the paging extension after the time interval, determining a gap for the terminal device to prepare for the paging extension, the gap starting with a control channel block occurring immediately after a last control channel block used by the terminal device for determining that the paging extension is required, wherein the gap includes at least one control channel block; and determining, based on the gap, the target paging group that is non-overlapped with the set of control channel blocks.

4. The method according to claim 1, further comprising: paging the terminal device on the target paging group.

5. A base station of a wireless communication network, comprising:
a processor; and
a storage medium containing instructions which, when executed by the processor, cause the base station to:
determine whether a paging extension to a paging group is required for a terminal device, the terminal device being associated with a first coverage class;
in response to determining that the paging extension is required for the terminal device, transmit a message in a downlink transmission to a further terminal device with a second coverage class, the message including an indication of the paging extension for the terminal device; and
determine a target paging group for the paging extension by determining an offset from the paging group, wherein the offset is determined based on the first coverage class and the second coverage class.

6. The base station according to claim 5, wherein the instructions further cause the base station to:
determine, based on the second coverage class, a set of control channel blocks used for the downlink transmission;
determine, based on the first coverage class and the set of control channel blocks, a time interval between completing the transmission of the message and a start of a candidate paging group, the time interval comprising the offset; and
determine, based on the time interval, the target paging group that is non-overlapped with the set of control channel blocks.

7. The base station according to claim 6, wherein the instructions further cause the base station to:
when the terminal device is deemed not ready for the paging extension after the time interval, determine a gap for the terminal device to prepare for the paging extension, the gap starting with a control channel block occurring immediately after a last control channel block used by the terminal device for determining that the paging extension is required, wherein the gap includes at least one control channel block; and
determine, based on the gap, the target paging group that is non-overlapped with the set of control channel blocks.

8. The base station according to claim 5, wherein the instructions further cause the base station to page the terminal device on the target paging group.

9. A non-transitory machine readable storage medium containing instructions which, when executed on a processor of a device that is implemented in a base station of a wireless communication network, are capable of causing the base station to perform operations comprising:
determining whether a paging extension to a paging group is required for a terminal device, the terminal device being associated with a first coverage class;
in response to determining that the paging extension is required for the terminal device, transmitting a message in a downlink transmission to a further terminal device with a second coverage class, the message including an indication of the paging extension for the terminal device; and
determining a target paging group for the paging extension by determining an offset from the paging group, wherein the offset is determined based on the first coverage class and the second coverage class.

10. The non-transitory machine readable storage medium according to claim 9, wherein the instructions, when determining the target paging group, are further capable of causing the base station to perform operations comprising:
determining, based on the second coverage class, a set of control channel blocks used for the downlink transmission;
determining, based on the first coverage class and the set of control channel blocks, a time interval between completing the transmission of the message and a start of a candidate paging group, the time interval comprising the offset; and
determining, based on the time interval, the target paging group that is non-overlapped with the set of control channel blocks.

11. The non-transitory machine readable storage medium according to claim 10, wherein the instructions, when determining the target paging group based on the time interval, are further capable of causing the base station to perform operations comprising:
when the terminal device is deemed not ready for the paging extension after the time interval, determining a gap for the terminal device to prepare for the paging extension, the gap starting with a control channel block occurring immediately after a last control channel block used by the terminal device for determining that the paging extension is required, wherein the gap includes at least one control channel block; and
determining, based on the gap, the target paging group that is non-overlapped with the set of control channel blocks.

12. The non-transitory machine readable storage medium according to claim 9, wherein the instructions are further capable of causing the base station to perform operations comprising:
paging the terminal device on the target paging group.

* * * * *

UNITED STATES PATENT AND TRADEMARK OFFICE
CERTIFICATE OF CORRECTION

PATENT NO. : 10,645,672 B2
APPLICATION NO. : 16/696881
DATED : May 5, 2020
INVENTOR(S) : Wang et al.

Page 1 of 1

It is certified that error appears in the above-identified patent and that said Letters Patent is hereby corrected as shown below:

On the Title Page

In Item (30), under "FOREIGN APPLICATION PRIORITY DATA", in Column 1, Line 1, delete "PCT/CN2017/080317" and insert -- PCT/CN2016/080317 --, therefor.

In the Specification

In Column 1, Line 8, delete "2016," and insert -- 2016, now U.S. Pat. No. 10,517,066, --, therefor.

In Column 6, Line 43, delete "communication system" and insert -- communication network --, therefor.

Signed and Sealed this
Fourth Day of August, 2020

Andrei Iancu
*Director of the United States Patent and Trademark Office*